United States Patent Office

3,219,605
Patented Nov. 23, 1965

3,219,605
POLYVINYL CHLORIDE STABILIZED WITH METAL MONO-ALKYL PHOSPHITES
Peter P. Klemchuk, Yorktown Heights, N.Y., assignor to Geigy Chemical Corporation, Greenburg, N.Y., a corporation of Delaware
No Drawing. Filed June 7, 1962, Ser. No. 200,673
9 Claims. (Cl. 260—23)

This invention relates to the stabilization of polyvinyl chloride compositions against degradation with stabilizer systems comprising salts of mono-organically substituted phosphites. In particular, the invention concerns the use of the cadmium, barium, calcium and/or zinc salts of monoalkylphosphites in the stabilization of polyvinyl chloride compositions against deterioration due to light.

The use of trialkyl phosphites in the stabilization of polyvinyl chloride compositions is known; however, the use of the specific monoalkyl phosphite salts of the invention for protection against light-induced deterioration of polyvinyl chloride compositions is new and unexpected.

It has now surprisingly been discovered that metal salts of the Formula I hereinbelow are remarkably effective light stabilizers for polyvinyl chloride compositions, either alone, or in combination with other light and/or thermal stabilizers:

$$(RO\overset{O}{\underset{H}{\overset{\|}{P}}}O)_2M \qquad (I)$$

wherein

R is an alkyl radical, e.g. alkyl having from 1 to 30 carbon atoms, preferably having from 1 to 12 carbon atoms, and M is a divalent metal which may be cadmium, barium, calcium or zinc.

While the compounds of the Formula I may be used alone as light stabilizers for polyvinyl chloride compositions, it is also advantageous to use the compounds of the Formula I in combination with other stabilizers, whereupon an enhanced stabilization effect is sometimes noted. Some examples of other stabilizers which are usefully employed in combination with the stabilizers of the Formula I are metal salts of epoxy carboxylic acids, especially the cadmium, barium, calcium and zinc salts of carboxylic acids having at least one epoxy ring therein and preferably containing from 8 to 18 carbon atoms.

Instead of metal salts of epoxy carboxylic acids, it is useful to employ metal salts of simple carboxylic acids, especially the cadmium, barium, calcium and zinc salts of carboxylic acids having from 8 to 18 carbon atoms therein. Alternatively, an epoxy compound may also be employed with the simple carboxylic acid salts to provide the same number of epoxy groups per molecule as would be present if the corresponding epoxy carboxylic acid salt were employed in place of the simple aliphatic acid salt without epoxy rings therein. A particularly advantageous combination of light stabilizers has been found to be that wherein a mixture of barium and cadmium salts is employed.

In the Formula I, some examples of alkyl groups represented by R are: methyl, ethyl, propyl, butyl, pentyl, hexyl, heptyl, octyl, 2-ethyl-hexyl, nonyl, decyl undecyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, heptacosyl, octacosyl nonacosyl, triacontasyl.

Polymeric material containing polymers of vinyl chloride finds use in a great variety of shaped articles, films, filaments, etc. It is of importance to find the optimum stabilization system for the protection of such items of polymeric material, not only during the fabrication and forming of such articles where temperatures of at least 150° C. are frequently employed, but also at lower temperatures which are experienced during ordinary usage. The invention is particularly valuable in preventing degradation due to light.

Although the protection of polyvinyl chloride polymers is illustrative of the invention, the same is not limited to stabilization of pure polyvinyl chloride but extends to the stabilization of mixtures of vinyl chloride and other monomers, as well as to polymers of other halogen-containing monomers.

Mixtures of several stabilizers of the Formula I may also be useful in stabilizer systems for protecting polyvinyl chloride, etc. Moreover, the stabilizers of the Formula I can also be employed in combination with other stabilizers, antioxidants, ultraviolet light absorbers, dyes, pigments, fillers, antistatic agents, plasticizers, etc.

The stabilizers of the invention are incorporated into the polymeric material to be stabilized in conventional ways and the amount of stabilizer may vary from about 0.001% to about 10% by weight, based upon the unstabilized material.

The compounds of the Formula I may be prepared from the corresponding alkali metal monoalkylphosphite by reaction of same with a suitable salt of the desired divalent metal. The intermediate alkali metal monoalkylphosphite may be prepared reacting phosphorus trichloride with the alkanol corresponding to the desired monoalkyl group in the compound of the Formula I to be prepared. Alternatively, the dialkyl phosphite suitable to yield the desired monoalkylphosphite is reacted with sodium hydroxide to remove one alkyl group.

In the following examples, unless otherwise indicated, parts are by weight, and the relationship between parts by weight and parts by volume is as that of grams to cubic centimeters. Temperature is in degrees centigrade.

*Example I.—Cadmium monolauryl phosphite*

Sodium monolauryl phosphite is prepared by adding to 41.9 parts of dilauryl phosphite in 200 parts by volume of ethanol dropwise over 15 minutes a solution of 4.08 parts of sodium hydroxide (97.9%) in 20 parts by volume of water and 25 parts by volume of ethanol. After standing at room temperature for about 18 hours the solution resulting therefrom is concentrated to dryness under vacuum and the slushy solid product is slurried with 350 parts by volume of anhydrous ether. Upon filtration the ether-insoluble product sodium monolauryl phosphite is washed with ether and dried under vacuum, yield being 17.6 parts.

An aqueous solution of 6.8 parts of sodium lauryl phosphite is added dropwise with stirring to a solution of 3.33 parts of cadmium acetate dihydrate in about 100 parts by volume of water. The precipitated cadmium salt is filtered, washed with water and dried under vacuum. Analysis for cadmium monolauryl phosphite is 19.1% cadmium and 9.83% phosphorus (theoretical, cadmium, 18.4%; phosphorus, 10.1%).

*Example II.—Calcium monolauryl phosphite*

In the same manner as in Example I, 6.8 parts of sodium monolauryl phosphite are reacted with 2.20 parts of calcium acetate monohydrate to yield calcium monolauryl phosphite whose analysis for calcium is found to be 6.68% (theory, 7.46%).

*Example III.—Zinc monolauryl phosphite*

In the same manner as in Example I, 6.8 parts of sodium monolauryl phosphite are reacted with 2.74 parts of zinc acetate dihydrate to yield zinc monolauryl phosphite having an analysis for zinc of 12.4% (theory, 11.5%).

*Example IV.—Barium monolauryl phosphite*

In the same manner as in Example I, 6.8 parts of sodium monolauryl phosphite are reacted with 3.05 parts of barium chloride dihydrate to yield barium monolauryl phosphite.

*Example V.—Cadmium monoethyl phosphite*

To a solution of 13.8 parts of diethyl phosphite in 200 parts by volume of anhydrous ethanol is added in about one minute with swirling a solution of 4.08 parts of sodium hydroxide in water. The resulting solution is allowed to stand overnight at room temperature, after which the same is concentrated under vacuum and the resulting concentrate triturated with acetone and filtered. The filter cake is dried under vacuum and yields 12.3 parts (93.5% of theory) of sodium monoethyl phosphite, melting at 181–183°.

Cadmium monoethyl phosphite crystallizes on cooling from a solution prepared from 9.24 parts of sodium monoethyl phosphite and 8.05 parts of anhydrous cadmium acetate in 50 parts by volume of hot methanol and has an analysis for cadmium of 31.3% (theory, 34.1%).

*Example VI.—Cadmium monobutyl phosphite*

Sodium monobutyl phosphite is prepared from 19.4 parts of dibutyl phosphite and 4.08 parts of sodium hydroxide as described for sodium monoethyl phosphite in Example V, above, in yield of 13.2 parts, melting at 170–172°.

Cadmium monobutyl phosphite crystallizes on cooling in an ice bath from a solution prepared from 11.2 parts of sodium monobutyl phosphite and 8.05 parts of anhydrous cadmium acetate in 50 parts by volume of hot methanol, with analysis for cadmium of 29.85% (theory, 29.1%).

*Example VII.—Cadmium mono-2-ethylhexyl phosphite*

Sodium mono-2-ethylhexyl phosphite is prepared from 30.6 parts of bis(2-ethylhexyl) phosphite and 4.08 parts of sodium hydroxide as described for sodium monoethyl phosphite in Example V, above, in yield of 19.5 parts.

Cadmium mono-2-ethylhexyl phosphite is precipitated by the addition of a solution of 9.31 parts of cadmium acetate dihydrate in 25 parts by volume of water to a solution of 15.12 parts of sodium mono-2-ethylhexyl phosphite in 100 parts by volume of water. The resultant gummy solid is extracted into 150 parts by volume of ether, and the product is isolated by distillation of the solvent. The so-obtained cadmium mono-2-ethylhexyl phosphite analyzes for cadmium, 22.2% (theory, 22.6%).

*Example VIII.—Stabilization of polyvinyl chloride*

A sample of stabilized resin containing a plasticizer (dioctyl phthalate) is prepared by milling for 5 minutes at 135° 100 parts of pilyvinyl chloride (QYSM–5, Bakelite, Union Carbide Corporation, New York, N.Y.), 50 parts of dioctyl phthalate and 2 parts of calcium monolauryl phosphite, the so-stabilized resin being protected against light instability as evidenced by tests in a Fadeometer at measured intervals. The stabilized resin is compared to a blank for development of color due to light-induced degradation and rated according to the Gardner Color Scale. After 240 hours the stabilized resin has a Gardner Color rating of 3, whereas the blank has a Gardner Color rating of 10.

If the zinc monolauryl phosphite is used in place of the calcium salt, then the resin is stabilized with a color rating of 0 after 240 hours. A 1:1 mixture of the zinc and the calcium monolauryl phosphites has a Gardner Color of 0 after 360 hours.

In similar fashion 2 parts of each of the following stabilizers per hundred of unstabilized polyvinyl chloride may be used to stabilize polyvinyl chloride resins:

Cadmium monolauryl phosphite
Barium monolauryl phosphite
Cadmium monoethyl phosphite
Cadmium monobutyl phosphite
Cadmium mono-2-ethylhexyl phosphite.

In similar fashion, 2 parts per hundred—in polyvinyl chloride, as described above—of a stabilizer system comprising 66.7% by weight of barium laurate and 33.3% by weight of cadmium monolauryl phosphite is used to produce a stable composition of polyvinyl chloride resin showing excellent stability to light and/or thermally induced degradation.

What is claimed is:

1. A composition of matter comprising polyvinyl chloride and from about 0.001% to about 10% of compound of the formula:

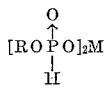

where

R is alkyl and
M is a number selected from the group consisting of barium, calcium, cadmium and zinc.

2. A composition according to claim 1, wherein said stabilizer is cadmium monolauryl phosphite.

3. A composition according to claim 1, wherein said stabilizer is calcium monolauryl phosphite.

4. A composition according to claim 1, wherein said stabilizer is barium monolauryl phosphite.

5. A composition according to claim 1, wherein said stabilizer is zinc monolauryl phosphite.

6. A composition according to claim 1, wherein said stabilizer is cadmium monoethyl phosphite.

7. A composition according to claim 1, wherein said stabilizer is cadmium monobutyl phosphite.

8. A composition according to claim 1, wherein said stabilizer is cadmium mono-2-ethylhexyl phosphite.

9. A composition according to claim 1 including a metal salt of a saturated aliphatic monocarboxylic acid having from 8 to 18 carbon atoms, said metal being selected from the group consisting of barium, calcium, cadmium and zinc.

References Cited by the Examiner

UNITED STATES PATENTS

| | | | |
|---|---|---|---|
| 2,564,646 | 8/1951 | Leistner et al. | 260—45.75 |
| 2,889,295 | 6/1959 | Darby et al. | 260—45.85 |
| 2,947,721 | 8/1960 | Newland et al. | 260—45.95 |
| 2,964,495 | 12/1960 | Newland et al. | 260—45.95 |
| 2,964,497 | 12/1960 | Kibler et al. | 260—45.75 |
| 2,965,606 | 12/1960 | Watchung et al. | 260—45.75 |
| 2,997,454 | 8/1961 | Leistner et al. | 260—45.75 |
| 3,030,334 | 4/1962 | Canarios et al. | 260—45.75 |

OTHER REFERENCES

Kosolapoff: "Organo-Phosphorus Compounds," John Wiley and Sons, Inc. (1950).

LEON J. BERCOVITZ, *Primary Examiner.*